(12) United States Patent
Howes et al.

(10) Patent No.: US 9,909,550 B1
(45) Date of Patent: Mar. 6, 2018

(54) REMOTE START/STOP SYSTEM AND METHOD FOR USE WITH VEHICLE TRANSPORT TRAILERS

(71) Applicant: Cottrell, Inc., Gainesville, GA (US)

(72) Inventors: Phillip Bryan Howes, Braselton, GA (US); David Trenbeath, Auburn, GA (US)

(73) Assignee: Cottrell, Inc., Gainesville, GA (US)

(*) Notice: Subject to any disclaimer, the term of this patent is extended or adjusted under 35 U.S.C. 154(b) by 0 days.

(21) Appl. No.: 15/436,912

(22) Filed: Feb. 20, 2017

(51) Int. Cl.
| | | |
|---|---|---|
| *F02N 11/08* | (2006.01) | |
| *B60P 3/08* | (2006.01) | |
| *B60P 1/43* | (2006.01) | |
| *B60P 1/44* | (2006.01) | |
| *B60K 25/06* | (2006.01) | |
| *F02B 63/06* | (2006.01) | |

(52) U.S. Cl.
CPC .......... *F02N 11/0807* (2013.01); *B60K 25/06* (2013.01); *B60P 1/436* (2013.01); *B60P 1/4471* (2013.01); *B60P 3/08* (2013.01); *F02B 63/06* (2013.01); *F02N 2200/0812* (2013.01)

(58) Field of Classification Search
None
See application file for complete search history.

(56) References Cited

U.S. PATENT DOCUMENTS

| | | | | |
|---|---|---|---|---|
| 4,286,683 A | * | 9/1981 | Zeigner | B60K 15/00 123/179.4 |
| 4,369,008 A | * | 1/1983 | Cooper | B60P 3/08 410/24.1 |
| 4,411,577 A | * | 10/1983 | Shearer, Jr. | B65G 1/0421 340/522 |
| 4,789,281 A | * | 12/1988 | Westerdale | B60P 3/08 180/286 |
| 5,080,541 A | * | 1/1992 | Andre | B60P 3/08 410/24.1 |
| 5,263,824 A | * | 11/1993 | Waldbeser | A62C 2/04 180/324 |

(Continued)

OTHER PUBLICATIONS

Boydstun Metal Works, "Boydstun Metal Works Introduces Fuel Efficient Auto Start System for Auto Haulers," Press Release, Aug. 9, 2007, Portland, Oregon.

*Primary Examiner* — Thomas G Black
*Assistant Examiner* — Sze-Hon Kong

(57) ABSTRACT

Improved remote start/stop systems and methods for use with a truck and/or vehicle transport trailer. Embodiments include a transport trailer and truck, the trailer comprising a platform that moves in response to a hydraulic system coupled to the platform. The hydraulic system is powered by the truck engine. A pressure transducer in communication with the hydraulic system is configured to measure a change in hydraulic pressure. A start/stop controller is in communication with the pressure transducer. The start/stop controller is configured to receive the measurements from the pressure transducer, determine to turn off the truck engine in response to the measurements, and provide an message via an indicator in communication with the start/stop controller, the indicator located proximate to a hydraulic control for the first hydraulic system. Some embodiments include a button that may override turning off the truck engine, or cause the truck engine to restart.

20 Claims, 4 Drawing Sheets

(56) References Cited

U.S. PATENT DOCUMENTS

| | | | | |
|---|---|---|---|---|
| 5,401,046 | A * | 3/1995 | Schwartz | B60S 9/12 |
| | | | | 254/419 |
| 7,575,402 | B2 * | 8/2009 | Boydstun, IV | B60P 3/08 |
| | | | | 410/24 |
| 9,556,808 | B2 * | 1/2017 | Yoo | F02M 3/08 |
| 2009/0218327 | A1 * | 9/2009 | Beeson | B23K 9/1006 |
| | | | | 219/133 |
| 2010/0318283 | A1 * | 12/2010 | Renner | B60P 3/14 |
| | | | | 701/112 |
| 2011/0221168 | A1 * | 9/2011 | Alexander | B62D 63/061 |
| | | | | 280/639 |
| 2012/0214643 | A1 * | 8/2012 | Rogner | F16D 25/0638 |
| | | | | 477/174 |
| 2014/0211344 | A1 * | 7/2014 | Pence | H02H 7/06 |
| | | | | 361/20 |
| 2015/0159613 | A1 * | 6/2015 | Jensen | B60W 10/02 |
| | | | | 701/68 |
| 2015/0175149 | A1 * | 6/2015 | Zhao | B60W 20/00 |
| | | | | 701/22 |
| 2015/0183435 | A1 * | 7/2015 | Johnson | F02N 19/10 |
| | | | | 701/112 |
| 2016/0084270 | A1 * | 3/2016 | Specks | E04G 21/0436 |
| | | | | 60/445 |
| 2017/0191865 | A1 * | 7/2017 | Kvist | G01G 19/08 |

* cited by examiner

REMOTE START/STOP SYSTEM AND METHOD FOR USE WITH VEHICLE TRANSPORT TRAILERS

DESCRIPTION OF THE RELATED ART

The present invention relates generally to automobile or vehicle transport trailers and control of the power applied to such trailers. Automobiles, vehicles, cargo containers, and other cargo loads may be hauled via a transport trailer ("trailer") attached to a separate truck. Multiple cargo loads, containers, or vehicles can be transported on such a trailer. It is well known to implement multiple levels or tiers on such trailers to maximize the number of vehicles transported, with one or more of the levels (or portions of such level) being able to raise, lower, and/or move horizontally. Each vehicle is secured to the trailer in some fashion, and each vehicle will be restrained to one of the upper level or platform, or the lower level or platform, such as by straps or chains For example, many trailers implement an upper platform and a lower platform such that two levels of vehicles may be transported at the same time. The power to move each of the upper platform and lower platform (or portions of each platform) may be electric or hydraulic, such as via a hydraulic fluid pump. When attached to the truck, the trailer may be powered by the engine of the truck via a power take off device ("PTO"). PTOs are well known devices allowing the power of a rotating gear, such as a rotating gear of the engine of truck, to be transferred to an auxiliary function, such as powering a hydraulic and/or electrical system of trailer. In this manner, the engine of truck may be used to power the motors/hydraulic pumps that move one or more of the platforms (or portions of the platform).

Movement of the platform(s) typically occurs by a user starting the truck, leaving the cab of the truck, and operating controls on the trailer to move the desired platform(s). Such controls are typically separate from any control of the truck itself, and provide no way to start or stop the truck engine, resulting in fuel losses when the truck engine continues to run when power to the trailer is no longer needed. Some prior systems exist to remotely start or stop a truck engine, but such systems cannot detect when work is being performed by the trailer and cannot shut off the truck when the work is completed to save fuel. Other prior art systems, such as a product by Green Fleet Industry (www.greenfleetindustry.com) allowed for automatic shutoff, but only had a display in the truck cab, so the operator could not see the status and other information while at the hydraulic controls outside the cab. Yet other prior systems use a controller for electric valves in a hydraulic system of a trailer, but such systems are ineffective when manual valves are used to control the hydraulic system of the trailer. Finally, detection mechanisms connected to a control module of the truck engine have been attempted to determine if the truck engine is operating; however these detection mechanisms cannot detect or provide feedback where and when work is being performed by the trailer and provide no way to remotely stop the truck engine manually when desired.

Accordingly, an improved systems and methods for controlling power supplied to trucks and/or vehicle transport trailers are needed that overcomes the shortcomings of the previous solutions and allow for fuel savings when power is no longer needed.

SUMMARY OF THE DISCLOSURE

Improved systems and methods for controlling for power in trucks and/or vehicle transport trailers are disclosed. In particular, remote start/stop systems and methods for use with a truck and/or trailer are disclosed. Exemplary embodiments include a transport trailer and truck, the trailer comprising a platform that moves in response to a hydraulic system coupled to the platform. The hydraulic system is powered by the truck engine. A pressure transducer in communication with the hydraulic system is configured to measure a change in hydraulic pressure. A start/stop controller is in communication with the pressure transducer. The start/stop controller is configured to receive the measurements from the pressure transducer, determine to turn off the truck engine in response to the measurements, and provide an indication that the truck engine is about to turn off. Some embodiments include a button that may override turning off the truck engine, or cause the truck engine to restart.

Other systems, apparatuses, and/or methods will be or become apparent to one with skill in the art upon review of the following drawings and detailed description. It is intended that all such additional systems, apparatuses, and/or methods be included within this description, be within the scope of the exemplary embodiments, and be protected by the accompanying claims.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects. As used in this description, the terms "component," "module," "controller," and the like are intended to refer to software, hardware, firmware, or a combination of hardware and software. For example, a controller may be, but is not limited to being, a process or set of instructions or code executed by logic or a hardware component (such as a processor).

Exemplary embodiments include improved systems and methods for controlling power that may be used with trucks and/or vehicle transport trailers ("trailer") that are designed to transport vehicles such as automobiles, sport utility vehicles ("SUV"), etc. In particular, improved remote start/stop systems and methods are disclosed for hydraulic or electrical systems used to move portions of a trailer (or truck) using power supplied by the truck engine. An exemplary vehicle transport trailer 100 with which embodiments of the cargo container support apparatus and system may be used is illustrated in FIG. 1.

Figure 1:
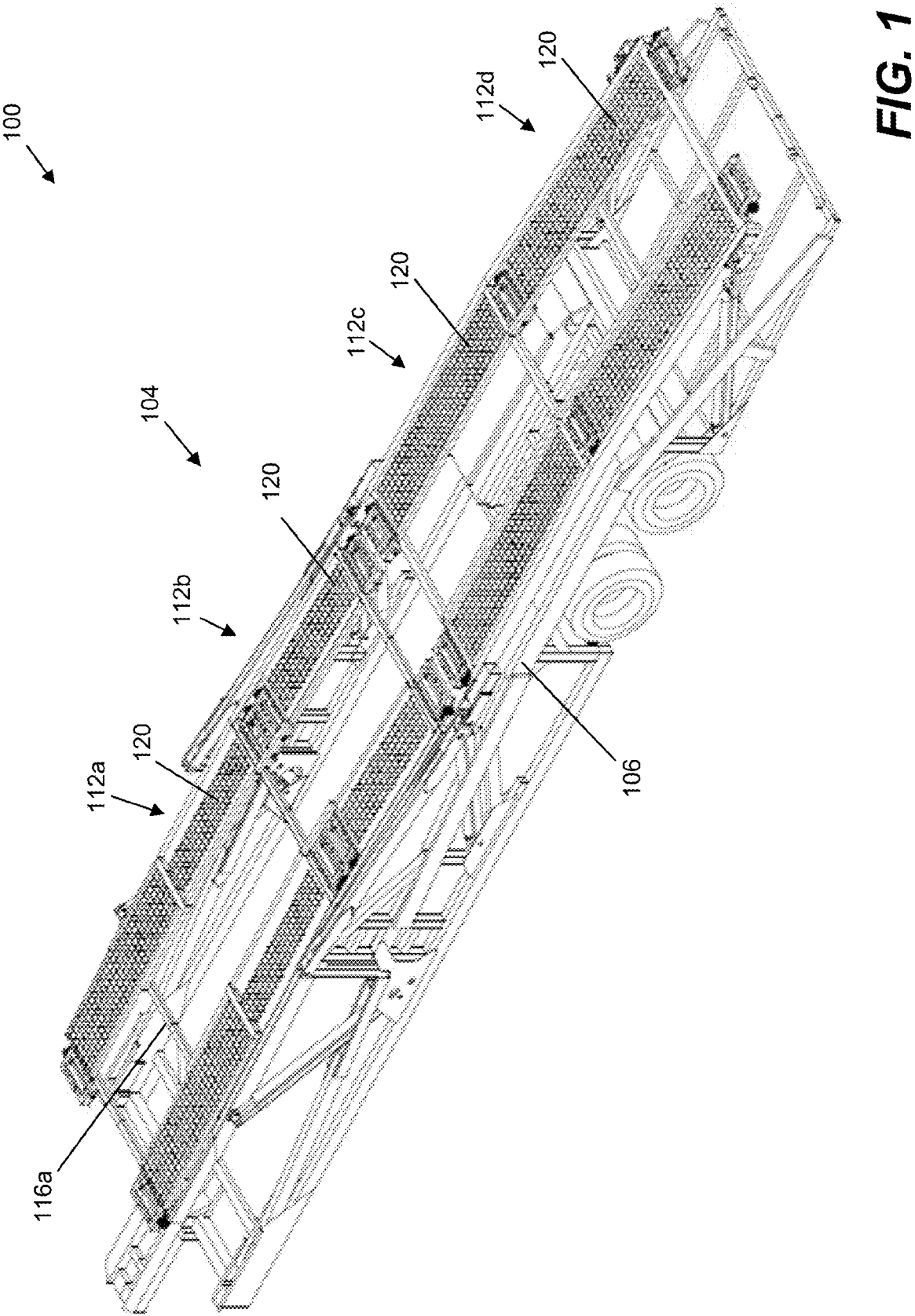
FIG. 1 illustrates a top perspective view of a typical vehicle transport trailer that may be attached to a truck.

FIG. 1 shows a multi-level vehicle transport trailer 100 in a collapsed configuration. The trailer 100 includes an upper platform 104 for transporting vehicles, the upper platform 104 including multiple upper sections 112a-112d with decking 120. The upper sections 112a-112d and decking 120 are sized and spaced so that vehicles may be driven onto, and secured to, the upper platform 104 with the cars left and right tires on the decking 120. The decking 120 typically includes a plurality of holes and/or grating, and the decking 120 may include roughened portions on the upper surface to allow vehicle tires to better grip the decking 120 when the vehicles are secured to the upper platform 104. Once cars are loaded onto the upper platform 104, the upper platform 104 may be raised so that vehicles may also be loaded onto a lower platform 106 of the trailer 100 in a similar manner to that described for the upper platform 104.

The upper platform 104 and lower platform 106 of the trailer may also be raised (or lowered) as desired, such as then the trailer 100 is empty or to assist in loading or unloading one or more of the platform(s) 104, 106. As will be understood, such movement may be accomplished with a hydraulic system (not illustrated) of the trailer 100. The hydraulic system may include one or more hydraulic fluid pumps controlled with electric or manual valves as desired. The hydraulic system may be powered by the engine of the truck via a power take off device ("PTO"). PTOs allow the power of a rotating gear, such as a rotating gear of the engine of truck, to be transferred to an auxiliary function, such as powering a hydraulic system of trailer. In this manner, the engine of truck may be used to power the hydraulic pumps that move one or more of the platforms 104, 106 (or portions of the platform).

Figure 2:
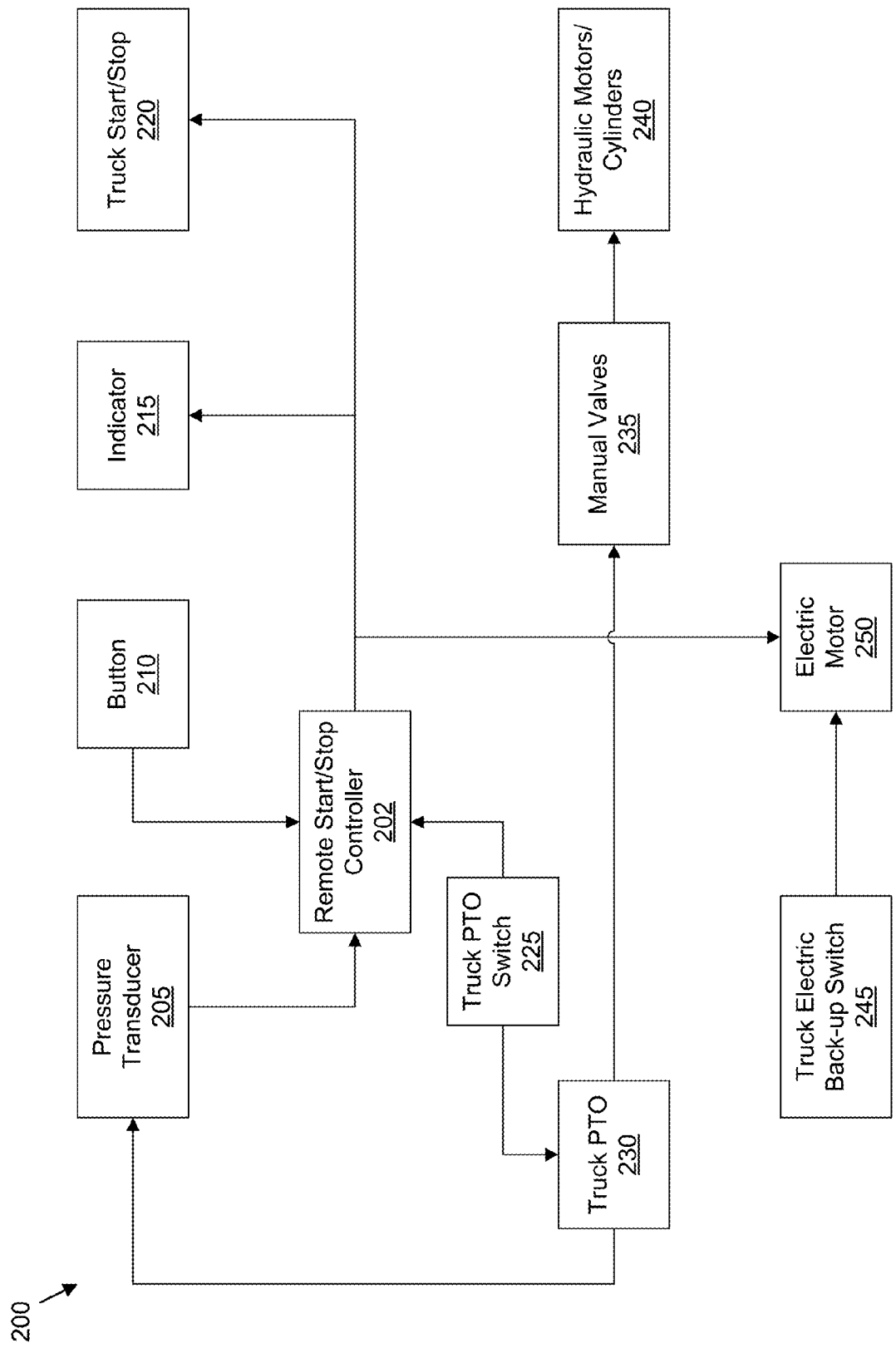
FIG. 2 is a block diagram illustrating components of an embodiment of a system to provide improved remote start/stop control.
Figure 3:
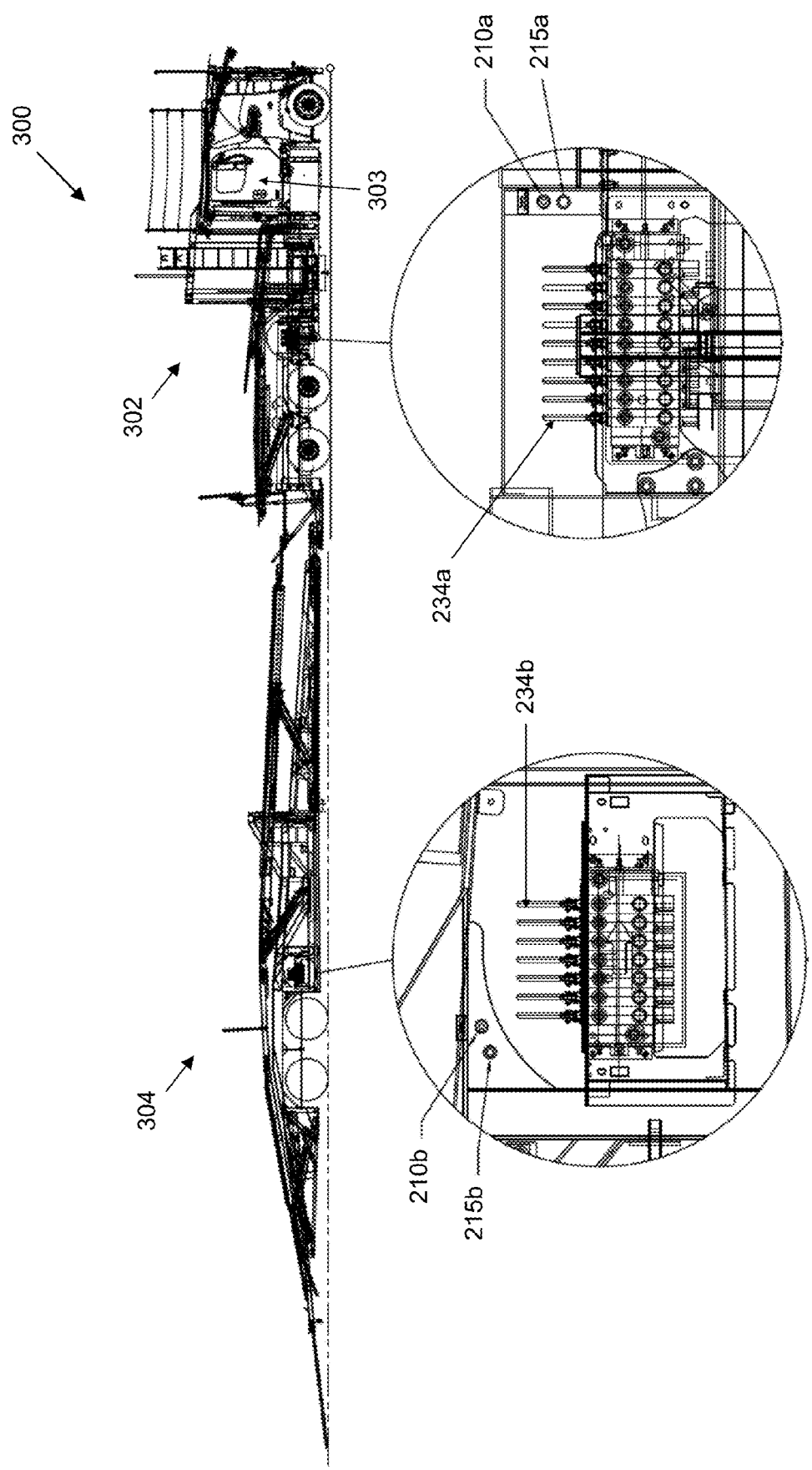
FIG. 3 illustrates a side view of an exemplary truck and vehicle transport trailer implementing the system of FIG. 2.

FIG. 2 is a block diagram illustrating components of an embodiment of a system 200 to provide improved control for power to a truck and trailer, such as the transport trailer 100 illustrated in FIG. 1 (or the truck 302/trailer 304 of FIG. 3). System 200 allows a user to save fuel by shutting the truck engine down when no work is being performed by the auxiliary systems (i.e. when the upper platform 104 or lower platform 106 are not being raised or lowered using a hydraulic system of the truck and/or trailer). Additionally, the system 200 allows the user to understand the status of the system and to re-start or stop the truck engine as desired without needing to leave the controls for the auxiliary system.

System 200 includes a remote start/stop controller 202 in communication with a truck PTO switch 225 which is in turn in communication with the truck PTO 230. The truck PTO 230 may be any desired design of PTO to allow the truck engine to provide power to an auxiliary system for moving the platforms 104, 106 of trailer 100 illustrated in FIG. 1. In the embodiment of FIG. 2, the power system for moving platforms 104, 106 is a hydraulic system including valves 235 and one or more hydraulic motors or cylinders 240 coupled to platforms 104, 106. As illustrated in FIG. 2, the truck PTO 230 is in communication with the valves 235 which are manual valves 235, but which may also be electric valves 235 in other implementations. The valves 235 in turn control the one or more hydraulic cylinders/motors 240 to move the desired platforms 104, 106 (or desired portion of platforms 104, 106) in the desired direction.

The PTO switch 225 is typically a switch in the cab of the truck that actives the truck PTO 230. The remote start/stop controller 202 also receives a communication or signal from the PTO switch 225. The communication from the PTO switch 225 to the remote start/stop controller 202 may in some embodiments serve to active the remote start/stop controller 202 and/or to allow the remote start/stop controller 200 to understand that the truck PTO 230 has been activated. The remote start/stop controller 202 may be implemented in hardware, software, or a combination of hardware and software. The remote start/stop controller 202 includes logic or a logical component to allow translation or understanding of the various signals or communications to remote start/stop controller 202 illustrated in FIG. 2 (and/or to perform the various functions discussed below).

System 200 also includes a pressure transducer 205 in communication with the truck PTO 230 and remote start/stop controller 202. In an embodiment, the pressure transducer 205 allows the system 200 to understand that the hydraulic systems is on via communication from the truck PTO 230 that the truck PTO 230 is active and/or by measuring the absolute pressure in the hydraulic system. In other embodiments, the signal or communication from the PTO switch 225 to the remote start/stop controller 202 allows the system 200 to understand that the truck is on. The pressure transducer 205 also allows the system 200 to understand when work is being done (i.e. when the hydraulic motors/cylinders 240 are being used). Pressure fluctuations in the hydraulic system indicating that the hydraulic motors/cylinders 240 are being used are detected by the pressure transducer 205 and a communication or signal is sent to the remote start/stop controller 202.

If no pressure fluctuations are detected by the pressure transducer 205, or if a pre-determined period of time passes without any detected pressure fluctuations, the remote start/stop controller 202 may determine that the hydraulic cylinders/motors 240 are not being used or that the pressure transducer 205 has failed. Alternatively, the remote start/stop controller 202 may receive a separate signal or communication, such as from the pressure transducer 205, indicating that the pressure transducer 205 has malfunctioned or has failed. In those events, remote start/stop controller 202 may determine to shut down the truck engine. After such determination, start/stop controller 202 causes the truck engine to be shut down, for example by sending a signal or communication to a truck start/stop module 220 that causes to truck engine to shut off. As a result, the system 200 may provide fuel savings by automatically shutting off the truck engine when the hydraulic system is not actually in use and/or when the pressure transducer 205 fails. The remote start/stop controller 202 may include logic to estimate the amount of fuel saved, such as by measuring the time between starts and stops during a specified time period, and may include memory to store the fuel saving estimates. Alternatively, such fuel saving estimates may be saved to a memory elsewhere in the system and/or may be displayed to a user.

The illustrated embodiment of system 200 further includes one or more buttons (shown in FIG. 2 as button 210) and indicators (shown in FIG. 2 as indicator 215) in communication with the remote start/stop controller 202. In an embodiment, a button 210 and indicator 215 may be located at each location of the truck or trailer where the hydraulic system may be controlled. In some embodiments, this may comprise a single button 210 and indicator 215; while in other embodiments multiple buttons 210 and indicators 215 may be implemented in different locations on the trailer and/or truck (see FIG. 3).

Indicator 215 may be any desired mechanism, display or system to provide information from the remote start/stop controller 202 to the user either visually or verbally/via sound. In the illustrated embodiment (see FIG. 3), indicator may comprise multiple different indicator lights 215 affixed to one or more of the truck and trailer. In other embodiments, indicator 215 may instead or additionally comprise a screen or display to provide information visually to the user, may comprise a speaker to provide information verbally or via sound signals to a user, and/or may be a separate component remote from the truck or trailer providing visual and/or sound signals.

Regardless of how implemented, indicator 215 may receive signals or communications from remote start/stop controller 202 and display or provide information to the user. For example, in an embodiment the system 200 or remote start/stop controller 202 may indicate which part of a hydraulic system is active such as by illuminating only a first indicator light 215a (see FIG. 3) when a first portion of the hydraulic system is active and/or illuminating only a second indicator light 215b (see FIG. 3) when a second portion of the hydraulic system is active. In other embodiments, different types of indicator(s) 215 may be used, or indicator lights 215a/215b may be illuminated/turned off in a pattern to indicate which part of the hydraulic system is active. Other information that may communicated from the remote start/stop controller 202 via the indicator 215 may include a state of the system 200, when the truck PTO 230 is on, when the truck engine is about to shut off, when the hydraulic system is off, when the pressure transducer 205 is malfunctioning, or any other information that may be desirable for a user at the hydraulic system controls to know or understand.

Button 210 may be any desired switch, button, or mechanism that may be activated by a user to send a signal or communication to the remote start/stop controller 202. In the illustrated embodiment (see FIG. 3) button 210 may comprise multiple different buttons 210 affixed to one or more of the truck and trailer. In other embodiments, button 210 may be a separate component or mechanism, remote from truck or trailer, capable of sending a signal or communication from the user to the remote start/stop controller 202.

Regardless of how implemented, button 210 may be used to send signals or communications from the user to the remote start/stop controller 202 in order to cause certain actions to take place and/or to cause certain actions not to take place. For example, if the truck engine has been shut off (including shut off by the remote start/stop controller 202), button 210 may be activated by the user to cause the remote start/stop controller 202 to start/re-start the truck engine without the need to leave the hydraulic system controls. Additionally or alternatively, if the truck engine is on, button 210 may be activated by the user (such as by holding down for a predetermined time period) to cause the remote start/stop controller 202 to stop the truck engine, again without the need to leave the hydraulic system controls. Similarly, in the event that the indicator 215 signals that the truck engine is about to shut off, the user may activate the button 210 to indicate that work is being done and/or to override the automatic shut-down of the truck engine.

System 200 may also or optionally include a truck electric switch 245 in communication with one or more electric motors 250. In the illustrated embodiment of FIGS. 2 and 3, the platforms 104, 106 (see FIG. 1) are moved by a primary hydraulic system. The illustrated embodiment may also implement a back-up electrical system comprising a truck electric back-up switch 245 and one or more back-up electric motors 250 coupled to platforms 104, 106 to move the desired platforms 104, 106 (or desired portion of platforms 104, 106) in the desired direction. In other embodiments the electric switch 245 and one or more electric motors 250 may be the primary, rather than back-up method of moving the platforms 104, 106.

As shown in FIG. 2, remote start/stop controller 202 may also be in communication with one or more of electric back-up switch 245 and electric motor(s) 250 and may also be used to control the electric motor(s) 250 in a manner similar to that discussed above. For example, if the PTO switch 225 is not on in the truck cab and there is no hydraulic pressure detected by the pressure transducer 205, the remote start/stop controller 202 may determine to activate one or more electric motor(s) 250 to allow movement of the desired platforms 104, 106. Remote start/stop controller 202 may also send indications to the user via indicator 215, and receive input from the user via button 201, for the one or more electric motor(s) 250 in a manner similar to that discussed above. Thus, the same button(s) 210 and indicator (s) 215 may also be used to control/receive information about the electric system for moving the platform(s) 104, 106 in addition to the primary hydraulic system. Additionally, the remote start/stop controller 202 may operate to ensure that the primary hydraulic system and back-up electric system are not engaged or running at the same time, such as when a user accidently attempts to engage both systems at the same time.

FIG. 3 illustrates a side view of aspects of an exemplary truck 302 and vehicle transport trailer 304 that may implement the system 200 of FIG. 2. The vehicle transport trailer ("trailer") 304 may include an upper platform and lower platform moved by a hydraulic system comprised of one or more hydraulic cylinders/motors as discussed above (not detailed in FIG. 3). Truck 303 may include a cab 303 in which one or more of the switches illustrated in FIG. 2, such as PTO switch 225 and/or electric back-up switch 245 may be located. As illustrated in the additional detail shown in FIG. 3, the truck 302 and trailer 304 may have separate hydraulic controls 234a and 234b, respectively, to control the movement of the platforms of the truck 302 and trailer 304. The hydraulic controls 234a and 234b may comprise manual valves, each valve controlled by a handle or grip as illustrate din FIG. 3. Additionally, separate buttons 210a, 201b and indicator lights 215a, 215b are located at or near each of the hydraulic controls 234a, 234b. Thus, for the illustrated embodiment, a first button 210a and first indicator light 215a is affixed to the truck 302 near the hydraulic controls 234a for the truck 302 platform(s). Similarly, a second button 210b and second indicator light 215b is affixed to the trailer 304 near the hydraulic controls 234b for the trailer 304 platform(s). Each of the buttons 210a/201b and indicator lights 215a/215b is in communication with the remote start/stop controller 202 illustrated in FIG. 2 and may operate in the manner or provide the functionality discussed above. As discussed, other configurations or locations of the buttons 210a/210b and indicators 215a/215b are possible.

Figure 4:
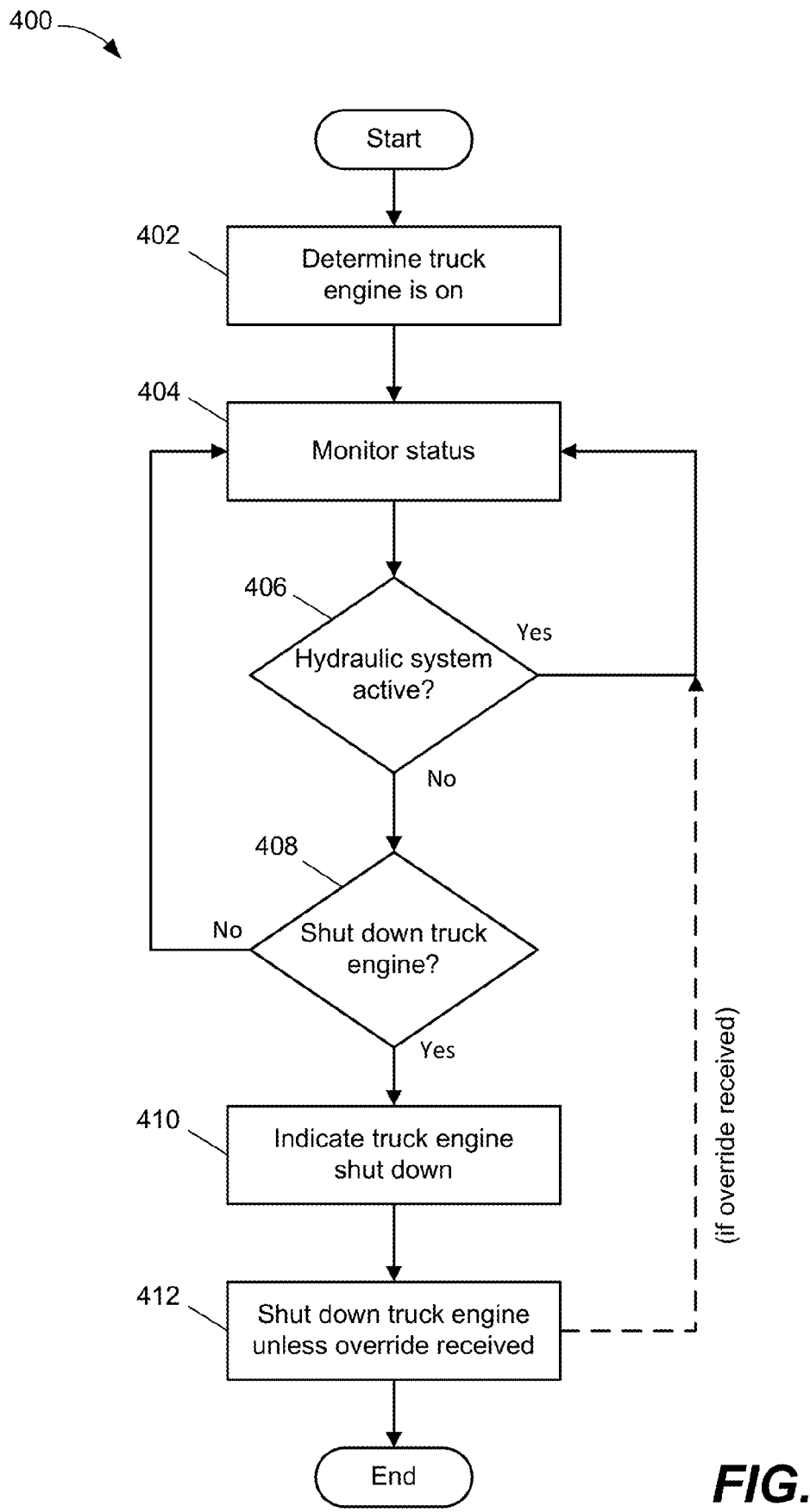
FIG. 4 is a flow diagram illustrating an embodiment of a method to provide improved remote start/stop control.

FIG. 4 is a flow diagram illustrating an embodiment of a method 400 to provide improved remote start/stop control, such as for a truck 302 and/or trailer 304 illustrated in FIG. 3. Method 400 may be implemented by system such as system 200 of FIG. 2. The exemplary method 400 begins at block 402 where a determination is made that the truck engine is on 402. This determination may be made via a signal or communication received at the remote start/stop controller 202, such as a signal from the PTO switch 225 caused by the activation of the PTO switch 225. Alternatively, this determination may be made by a measurement of the absolute pressure in the hydraulic system of the truck and/or trailer by the pressure transducer 205.

In block 404 the status is monitored by the remote start/stop controller 202. Monitoring the status in block 404 may include periodically polling one or more components of the system 200 for signals or receiving periodic signals from one or more components of the system 200. Such signals may include a signal or measurement from the pressure transducer 205 indicating a pressure fluctuation (or lack of a pressure fluctuation) in the hydraulic system for the truck or trailer. Such signals may also include signals caused or generated by a user activating one or more button(s) 210 of system 200.

Method 400 proceeds to block 406 where a determination is made whether one or more hydraulic system is active. This determination may be made by remote start/stop controller 202 either acting by itself or in conjunction with other components of the system 200. In an embodiment, the determination may be made separately for a hydraulic system of the truck and the hydraulic system of the trailer (such as truck 302 and trailer 304 of FIG. 3). The determination(s) in block 406 may be made based on one or more inputs or signals received by the start/stop controller 202, including such inputs or signals received in block 404. Exemplary inputs or signals may include a signal from one or more button(s) 210 activated by a user, or an indication from pressure transducer 205 of a pressure fluctuation (or lack of a pressure fluctuation). If the determination in block 406 is yes, one or more hydraulic systems are active, method 400 returns to block 404 and continues to monitor the status as discussed above.

If the determination in block 406 is that hydraulic system is inactive (or that both hydraulic systems are inactive in the case of multiple hydraulic systems), method 400 continues to block 408 where a determination is made whether to shut down the truck engine. The determination of block 408 may also be made based on one or more signals received during the preceding blocks. In an embodiment, the determination in block 408 may be based on a time period that the hydraulic system(s) have been inactive, or based on an input from a user via button(s) 310. If the determination is not to shut the truck engine down—for example if the hydraulic system(s) have not been inactive for a predetermined amount of time—then method 400 returns to block 404 and continues to monitor the status.

If the determination in block 408 is to shut the truck engine down an indication is sent to a user that the truck engine is about to shut down. In an embodiment, the indication may be sent to indicator 315 of system 200. For example, in the embodiment of FIG. 3, the indication may comprise causing both indicator lights 315a/315b to flash a predetermined number of times or may comprise causing the indicator light 315a/315b for the most recently active hydraulic system to flash. In other embodiments, the indication may take other forms depending on the nature of the indicator 315 used (i.e. a display screen on the truck or remote from the truck, a speaker providing verbal or sound indications on the truck or remote from the truck, etc.).

Method 400 continues to block 412 where the truck engine is shut down, for example to conserve fuel, unless an override is received. As discussed above an override in block 412 may comprise a user activating button 210 in a manner (such as by activating button 210 for a certain amount of time) to indicate to the remote start/stop controller 202 that work is being performed by the hydraulic system. If an override is received, the truck engine is not shut off and method 400 returns to block 404 and monitors the status. If no override is received the truck engine is shut off, such as by remote start/stop controller sending a signal or communication to truck start/stop module 220, and method 400 ends.

FIG. 4 describes only one exemplary embodiment of the disclosed method 400. In other embodiments, additional blocks or steps may be added to the method 400 illustrated in FIG. 4. Similarly, in some embodiments various blocks or steps shown in FIG. 4 may be combined or omitted. Such variations of the method 400 are within the scope of this disclosure. Additionally, certain steps in the processes or process flows described in this specification, including FIG. 4 may naturally precede others for the invention to function in the embodiments as described. However, the disclosure is not limited to the order of the steps described if such order or sequence does not alter the functionality of the invention. Moreover, it is recognized that some steps may performed before, after, or in parallel (substantially simultaneously) with other steps without departing from the scope of the disclosure.

While the invention has been described with reference to exemplary embodiments, it will be understood by those skilled in the art that various changes may be made and equivalents may be substituted for elements thereof without departing from the scope of the invention, including the alternate embodiments discussed above. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc., do not denote a limitation of quantity, but rather denote the presence of at least one of the referenced item. Similarly, use of the terms set, plurality, etc., also do not denote a limitation of quantity, but rather denote the presence of at least two of the reference item.

What is claimed is:

1. A remote start/stop system, the system comprising:
a transport trailer coupled to a truck, the transport trailer comprising a platform configured to move in response to a hydraulic system coupled to the platform, the hydraulic system powered by an engine of the truck;
a pressure transducer in communication with the hydraulic system, the pressure transducer configured to measure an absolute hydraulic pressure of the hydraulic system and measure a change in hydraulic pressure of the hydraulic system;
a start/stop controller in communication with the engine and the pressure transducer, the start/stop controller configured to:
receive the measurements from the pressure transducer,
determine the truck engine is on in response to the measurement of the absolute hydraulic pressure of the hydraulic system, and
turn off the truck engine in response to the measurement of the change in hydraulic pressure of the hydraulic system; and
an indicator in communication with the start/stop controller, the indicator located proximate to a hydraulic control for the hydraulic system and configured to indicate that the hydraulic system is active, when the truck engine is about to shut off, when the pressure transducer has malfunctioned, or a combination thereof.

2. The system of claim 1, wherein:
the truck comprises a truck platform configured to move in response to the hydraulic system coupled to the truck platform, and
the start/stop controller is further configured to turn off the truck engine in response to the measurements of the change in the hydraulic pressures of the hydraulic system caused by movement of the truck platform.

3. The system of claim 1, wherein the measurements indicate a lack of change in the hydraulic pressures of the hydraulic system.

4. The system of claim 2, wherein the indicator comprises a first indicator light affixed to the trailer proximate to the hydraulic control for the trailer platform.

5. The system of claim 4, wherein the indicator comprises a second indicator light affixed to the truck proximate to a second hydraulic control for the truck platform.

6. The system of claim 2, further comprising a button in communication with the start/stop controller, the button configured to override the turning off of the truck engine by the start/stop controller when the button is activated.

7. The system of claim 6, wherein the button is further configured to start the truck engine when activated.

8. The system of claim 6, wherein the button is affixed to the trailer proximate to the hydraulic control for the hydraulic system and the system further comprises a second button affixed to the truck proximate to a second hydraulic control.

9. The system of claim 1, wherein the start/stop controller is further configured to estimate a fuel savings from turning off the truck engine and record the estimate in a memory.

10. The system of claim 1, further comprising:
an electric system coupled to the platform and configured to move the platform, the electric system powered by the truck engine, wherein the start/stop controller is further configured to prevent the hydraulic system and the electric system operating at the same time.

11. The system of claim 10, wherein:
the start/stop controller is further configured to turn off the truck engine in response to a determination that the electric system is inactive, and
the button is configured to override the turning off of the truck engine by the start/stop controller in response to the determination that the electric system is inactive when the button is activated.

12. The system of claim 1, wherein the start/stop controller is further configured to turn off the truck engine in response to a signal indicating that the pressure transducer has failed.

13. A method for providing start/stop control of an engine in a truck coupled to a vehicle transport trailer, the method comprising:
determining that the truck engine is on;
measuring with a pressure transducer a change in hydraulic pressure of a hydraulic system coupled to the vehicle transport trailer;
determining with a start/stop controller to turn off the truck engine in response to the measured change in hydraulic pressure of the hydraulic system;
sending a communication from the stop/start controller to an indicator of the determination to turn off the truck engine, the indicator located proximate to a hydraulic control for the hydraulic system; and
displaying a message with the indicator to a user, the message indicating that the truck engine is turning off.

14. The method of claim 13, wherein the measurement with the pressure transducer indicates a lack of change in the hydraulic pressure of the hydraulic system.

15. The method of claim 13, wherein the indicator comprises an indicator light affixed to the trailer at a hydraulic control for the hydraulic system.

16. The method of claim 13, further comprising:
receiving an override signal at the start/stop controller the override signal configured to prevent the start/stop controller from turning off the truck engine.

17. The method of claim 16, wherein the override signal is received from a button in communication with the start/stop controller, the button affixed to the trailer at the hydraulic control for the hydraulic system.

18. The method of claim 13, further comprising:
estimating a fuel savings from turning off the truck engine; and
recording the estimated fuel savings.

19. The method of claim 13, further comprising:
receiving a re-start signal from a button in communication with the start/stop controller, the re-start signal configured to cause the start/stop controller to re-start the truck engine.

20. The method of claim 13, further comprising:
determining to turn off the truck engine in response to a notification received at the start/stop controller indicating that the pressure transducer failed.

* * * * *